United States Patent Office 3,065,210
Patented Nov. 20, 1962

3,065,210
VINYLIDENE AROMATIC PHOSPHINE MONOMERS
John G. Abramo, Earl C. Chapin, and Albert Y. Garner, Springfield, Mass., assignors to Monsanto Chemical Company, St. Louis, Mo., a corporation of Delaware
No Drawing. Filed Apr. 6, 1960, Ser. No. 20,276
12 Claims. (Cl. 260—80)

This invention relates to novel vinylidene monomers containing reactive phosphorus groups. More particularly, it relates to novel ethylenically unsaturated aromatic compounds containing phosphomethyl groups substituted on the aromatic nuclei.

The technology of phosphorus polymers has heretofore remained relatively undeveloped. However, these polymers are growing increasingly attractive for use in specialized applications wherein their novel properties may be advantageously utilized.

It is an object of this invention to provide novel phosphorus containing vinylidene monomers.

Another object is the provision of novel vinylidene aromatic monomers containing phosphomethyl groups and a process for their manufacture.

A further object is the provision of novel oxygen-scavenging polymers.

These and other objects are attained by contacting a beta-haloalkyl halomethyl aromatic compound of the class hereinafter described with an alkali metal salt of a secondary organophosphine at a temperature of from −50 to +50° C. to form novel intermediates which are subsequently dehydrohalogenated in the presence of an alkali metal base.

The following examples are presented in illustration of the invention and are not intended as limitations thereon.

*Example I*

One hundred ml. of a liquid ammonia solution (ca. −40° C.) containing 45 grams (about 0.4 mol) of diethyl sodiophosphine are slowly charged, under a nitrogen atmosphere, to 75 grams (about 0.4 mol) of para-(beta-chloroethyl)benzylchloride contained in a stirred reactor. The reaction temperature is maintained at about −40° C. throughout such addition and until a total reaction period of about 2 hours has elapsed. The ammonia is volatilized, under a nitrogen atmosphere, by allowing the reaction mixture to warm to room temperature. The residue is then vacuum distilled, yielding a fluid intermediate product which is identified by infrared and elemental analysis as diethyl para-(beta-chloroethyl)benzylphosphine. The intermediate is combined with 0.1 gram of tertiarybutyl catechol and a solution of 23 grams (about 0.4 mol) of potassium hydroxide dissolved in 500 ml. of ethanol in a second stirred reactor. This reaction mixture is heated at reflux (circa 780 C.) for 6 hours, under a nitrogen atmosphere, then poured into deaerated water, extracted with benzene and finally distilled under nitrogen to remove water and benzene. The residue is vacuum distilled to yield a viscous fluid which is established by infrared spectroscopy and elemental analysis as diethyl para-vinyl benzylphosphine.

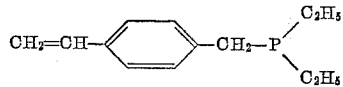

*Example II*

One hundred ml. of a dioxane solution containing 83 grams (about 0.4 mol) of diphenyl sodiophosphine are slowly charged, under a nitrogen atmosphere, to 75 grams (about 0.4 mol) of meta-(beta-chloroethyl)benzylchloride contained in a stirred reactor. The reaction temperature is maintained at substantially room temperature throughout such addition and until a total reaction period of about 4 hours has elapsed. The resulting mixture is vacuum distilled, yielding a fluid intermediate product which is identified by infrared and elemental analysis as diphenyl meta-(beta-chloroethyl)benzylphosphine. The intermediate is combined with 0.1 gram of tertiarybutyl catechol and a solution of 50 grams (about 0.4 mol) of sodium phenolate dissolved in 300 ml. of acetone in a second stirred reactor. This reaction mixture is heated at reflux (circa 56° C.) for 10 hours under a nitrogen atmosphere, then poured into water, extracted with ether, dried and evaporated to remove the ether. The crystalline residue is recrystallized from benzene and identified by infrared spectroscopy and elemental analysis as diphenyl meta-vinyl benzylphosphine.

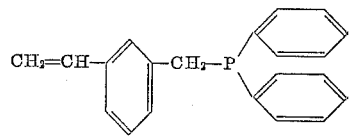

*Example III*

One hundred ml. of a dioxane solution containing 21 grams (about 0.1 mol) of diphenyl sodiophosphine are slowly charged, under a nitrogen atmosphere, to 24 grams (about 0.1 mol) of 1-(beta-chloroethyl)-4-chloromethyl naphthalene contained in a stirred reactor. The reaction temperature is maintained at room temperature throughout such addition and is subsequently increased to and maintained at about 40° C. until a total reaction period of about 4 hours has elapsed. The resulting reaction mixture is vacuum distilled, yielding a crystalline intermediate product which, after recrystallization from benzene, is identified by infrared and elemental analysis as 1-(beta-chloroethyl)-4-chloromethylnaphthyl diphenylphosphine. The intermediate is dissolved in 50 ml. of dioxane, which solution is then combined with 0.1 gram of tertiarybutyl catechol and a solution of 4 grams (about 0.1 mol) of sodium hydroxide dissolved in 300 ml. of ethanol in a second stirred reactor. This reaction mixture is heated at reflux (circa 80° C.) for 6 hours under a nitrogen atmosphere, then poured into water, extracted with benzene and then distilled to remove water and benzene. On cooling, a crystalline product is obtained which is identified by infrared spectroscopy and elemental analysis as 1-vinyl-4-diphenylphosphinomethyl naphthalene.

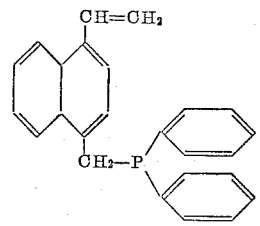

The beta-haloalkyl halomethyl aromatic compounds employed in the practice of this invention correspond to the general formula:

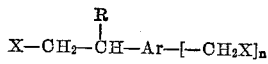

In this formula, $n$ is an integer of from 1–3, R may be either hydrogen or a methyl radical, each X is an independently selected halogen radical and Ar is a polyvalent aromatic residue containing from 6–14 carbon atoms and having a valency numerically equal to $n+1$. Therefore, the para-(beta-chloroethyl)benzylchloride, the meta-(beta-chloroethyl)benzylchloride and the 1-(beta-chloroethyl)-4-chloromethyl naphthalene employed in the examples, may be replaced, for example, with one of the following, with equivalent results: ortho-(beta-chloromethyl)benzylbromide, para-(beta-bromoethyl)benzyliodide, meta-(beta-fluoroisopropyl)benzylchloride, 2-(beta-chloroisopropyl)-6-chloromethyl naphthalene, 1-(beta-chloroethyl)-4-chloromethyl naphthalene, 9-(beta-chloroethyl)-10-bromomethyl anthracene, 1-(beta-chloroethyl)-2,4-di-(chloromethyl)benzene, 1-(beta-chloroethyl)-3,6-di-(chloromethyl)naphthalene, 2-(beta-chloroethyl)-9,10-di-(bromomethyl)anthracene, 1-(beta-chloroethyl)-2,4,6-tri-(chloromethyl)benzene, 2-(beta-chloroethyl)-1,4,6-tri-(chloromethyl)naphthalene, 9-(beta-chloroethyl)-3,6,10-tri-(chloromethyl)anthracene, etc. Mixtures of such compounds may also be employed.

The alkali metal salts of secondary organophosphines employed in the practice of this invention correspond to the general formula:

$R_1$ and $R_2$ are independently selected hydrocarbon radicals containing from 1 to 20 carbon atoms. M is an alkali metal; i.e., either lithium, sodium, potassium, cesium or rubidium. Therefore, the diethyl sodiophosphine and the diphenyl sodiophosphine employed in the examples may be replaced, for example, with one of the following with equivalent results; dimethyl potassiophosphine, diisopropyl lithiophosphine, disecondarybutyl sodiophosphine, dicyclohexyl sodiophosphine, diisooctyl potassiophosphine, dieicosyl sodiophosphine, diphenyl cesiophosphine, dinaphthyl sodiophosphine, the homologous series of from methylethyl potassiophosphine through eicosylethyl potassiophosphine, methylphenyl rubidiophosphine, etc. Mixtures of such phosphines may be employed. Such salts are readily prepared by reacting substantially equimolar proportions of the alkali metal and the appropriate secondary organophosphine in a highly polar but inert solvent, e.g., liquid ammonia or sulfur dioxide, dioxane, tetrahydrofuran, etc., under an inert atmosphere. This type of synthesis is described in greater detail by C. H. S. Hitchcock and F. G. Mann in the Journal of the Chemical Society, June 1958 (429), pp 2081–2086.

The novel ethylenically unsaturated aromatic phosphines of this invention are prepared in an essentially two-step process. In the first step, the beta-haloalkyl halomethyl aromatic compound and the alkali metal salt of the secondary organophosphine heretofore described, are coreacted in substantially stoichiometric proportions at a temperature of from about −50 to 100° C. More particularly, at least 1 molar proportion of the secondary organophosphine salt is employed for each molar equivalent proportion ($n$) of halomethyl groups present in the beta-haloalkyl halomethyl aromatic compound. To avoid oxidation of the phosphine groups, it may be necessary to conduct the reaction under an inert, e.g., nitrogen atmosphere. Such a precaution is extremely advisable when the $R_1$ and $R_2$ groups present are lower alkyl groups. The reaction is conducted in the presence of an inert polar solvent of the type employed in the preparation of the secondary organophosphine salt. In a preferred embodiment, an inert polar solvent solution of the secondary organophosphine salt is added slowly to the beta-haloalkyl halomethyl aromatic compound, thus assuring a molar excess of the latter component during the reaction and, consequently, a more controlled reaction.

An intermediate product corresponding to the general formula:

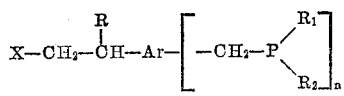

is obtained in the above reaction. As a group, these intermediates may be classified as beta-haloalkyl aromatic phosphines. In the above formula, $n$ is an integer of from 1 to 3, R is either hydrogen or methyl, X is a halogen radical, and Ar is a polyvalent aromatic residue as heretofore disclosed. The $R_1$ and $R_2$ radicals correspond to the hydrocarbon radicals contained in the secondary organophosphine salts employed. These intermediates may be recovered from the reaction mixture in about 40–85% yield using conventional techniques, e.g., recrystallization, vacuum distillation, etc. However, caution must again be used to avoid oxidation of the phosphine groups.

In the second step of this process, the intermediate obtained above is dehydrohalogenated in a substantially water-free polar solvent at a temperature of from about 50–120° C. employing an alkali metal base as the dehydrohalogenating agent, at least 1 molar proportion of alkali metal base should be employed for each molar proportion of intermediate. The ethylenically unsaturated aromatic phosphines produced are recovered from the final reaction mixture employing conventional techniques. For example, the final reaction mixture may be extended with water and the product extracted from said aqueous solution with benzene, followed by distillation to remove low-boiling constituents. The product may be further purified; for example, by vacuum distillation. Again, throughout this entire second step, as in the first step, an inert atmosphere should be used, whenever necessary, to avoid oxidation of the phosphine groups. In a preferred embodiment, the dehydrohalogenation, and especially the subsequent recovery of the product, is effected in the presence of a minor proportion, e.g., from about 0.01 to 2% by weight of a polymerization inhibitor. Conventional free radical scavengers such as tertiarybutyl catechol, hydroquinone, ditertiarybutyl cresol, phenylene diamine, etc. may be employed in such function.

Suitable bases for use in the dehydrohalogenation step of this process include, for example, alkali metal hydrides such as sodium hydride, potassium hydride, cesium hydride, etc.; alkali metal alkoxides such as sodium methoxide, potassium ethoxide, sodium dodecoxide, etc.; alkali metal hydroxides such as lithium hydroxide, sodium hydroxide, potassium hydroxide, rubidium hydroxide or cesium hydroxide; trialkylamines such as triethylamine, triisobutylamine, etc.; quinoline; etc.

Conventional polar solvents may be employed in the second step, i.e., the dehydrohalogenation, of this process. Examples of suitable polar solvents include 1 to 20 carbon atom aliphatic alcohols such as methanol, ethanol, isopropanol, butanol, hexanol, eicosanol, etc.; dioxane; tetramethylene sulfone; tetrahydrofuran; etc. To avoid the presence of water in the reaction system, substantially anhydrous polar solvents should be employed.

The novel ethylenically unsaturated aromatic phosphines, prepared as heretofore described, correspond to the general formula:

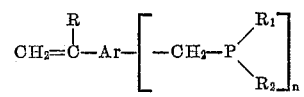

wherein $n$ is an integer of from 1 to 3, R is either a hydrogen or methyl radical, $R_1$ and $R_2$ are independently selected hydrocarbon radicals containing from 1 to 20 carbon atoms, and Ar is a polyvalent aromatic residue as heretofore described.

The products of this invention are generally viscous fluids. However, those of higher molecular weight, especially those containing aryl or higher alkyl groups attached to the phosphorus group, may be crystalline or waxy solids. As a class, these compounds are oxidizable in varying degree to the corresponding phosphine oxides. Those phosphines containing lower alkyl groups attached to the phosphorus group may require storage under inert atmospheres whereas those containing aryl or higher alkyl groups in such position are stable under ordinary storage conditions. Thus, these compounds, as well as polymers thereof, are useful as oxygen scavengers and antioxidants in, e.g., rubber, vinyl polymers, protective paints, etc.

*Example IV*

Fifteen grams of the diethyl para-vinyl benzylphosphine monomer prepared in Example I and 0.1 gram of azo-bis-iso-butyronitrile are charged to a reaction tube and placed under a nitrogen atmosphere. The reaction mixture is heated at about 100° C. for 20 hours to produce a hard, transparent, amorphous polymer. Infrared spectroscopy and elemental anaylsis establishes the polymers as corresponding to a plurality of recurring structural units of the formula:

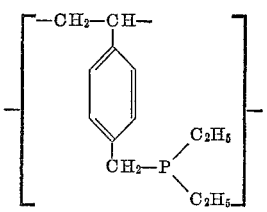

It is obvious that many variations may be made in the products and processes set forth above without departing from the spirit and scope of this invention.

What is claimed is:

1. An ethylenically unsaturated aromatic phosphine of the general formula:

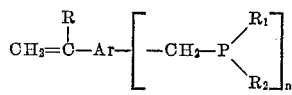

wherein R is a radical selected from the group consisting of hydrogen and methyl, $n$ is an integer of from 1 to 3, Ar is a polyvalent aromatic residue containing from 6 to 14 carbon atoms and having a valency numerically equal to $n+1$, and $R_1$ and $R_2$ are independently selected hydrocarbon radicals containing from 1 to 20 carbon atoms.

2. Diethyl para-vinyl benzylphosphine.
3. Diphenyl meta-vinyl benzylphosphine.
4. 1-vinyl-4-diphenylphosphinomethyl-naphthalene.
5. A beta-haloalkyl aromatic phosphine of the general formula:

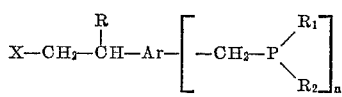

wherein X is a halogen radical, R is a radical selected from the group consisting of hydrogen and methyl, $n$ is an integer of from 1 to 3, Ar is a polyvalent aromatic residue containing from 6 to 14 carbon atoms and having a valency numerically equal to $n+1$, and $R_1$ and $R_2$ are independently selected hydrocarbon radicals containing from 1 to 20 carbon atoms.

6. Diethyl para-(beta-chloroethyl) benzylphosphine.
7. Diphenyl para-(beta-chloroethyl) benzylphosphine.
8. 1-(beta-chloroethyl)-4-chloromethyl-naphthyl diphenylphosphine napthalene.
9. A homopolymer comprised of a plurality of recurring structural units of the general formula:

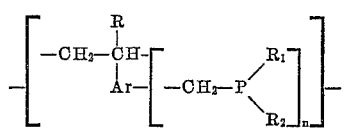

wherein R is a radical selected from the group consisting of hydrogen and methyl, $n$ is an integer of from 1 to 3, Ar is a polyvalent aromatic residue containing from 6 to 14 carbon atoms and having a valency numerically equal to $n+1$, and $R_1$ and $R_2$ are independently selected hydrocarbon radicals containing from 1 to 20 carbon atoms.

10. A process for preparing a beta-haloalkyl aromatic phosphorus compound of the general formula:

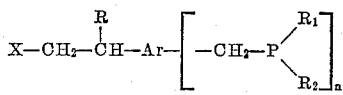

which comprises contacting 1 molar proportion of a beta-haloalkyl halomethyl aromatic compound of the general formula:

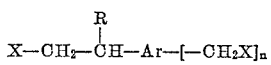

with at least $n$ molar proportions of an alkali metal salt of a secondary organophosphine of the general formula:

and mixtures thereof, under an inert atmosphere at a temperature of from about —50 to 100° C.; wherein in each of the above formulae, X is a halogen radical, R is a radical selected from the group consisting of hydrogen and methyl, $n$ is an integer of from 1 to 3, Ar is a polyvalent aromatic residue containing from 6 to 14 carbon atoms and having a valency numerically equal to $n+1$, $R_1$ and $R_2$ are independently selected hydrocarbon radicals containing from 1 to 20 carbon atoms, and M is an alkali metal.

11. A process for perparing an ethylenically unsaturated aromatic phosphorus compound of the general formula:

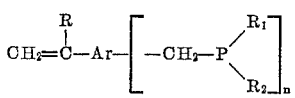

which comprises contacting 1 molar proportion of a beta-halo-alkyl aromatic phosphine of the general formula:

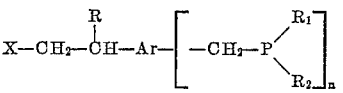

with a least 1 molar proportion of a base in a substantially anhydrous polar solvent under an inert atmosphere at a temperature of from about 50 to 120° C.; wherein, in each of the above formulae, X is a halogen radical, R is a radical selected from the group consisting of hydrogen and methyl, $n$ is an integer of from 1 to 3, Ar is a polyvalent aromatic residue containing from 6 to 14 carbon atoms and having a valency numerically equal to $n+1$, and $R_1$ and $R_2$ are independently selected hydrocarbon radicals containing from 1 to 20 carbon atoms.

12. A process for preparing an ethylentically unsaturated aromatic phosphorus compound of the general formula:

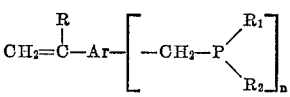

which comprises (1) contacting one molar proportion of a beta-haloalkyl halomethyl aromatic compound of the general formula:

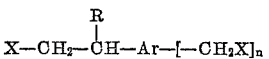

with a least $n$ molar proportions of an alkali metal salt of a secondary organophosphine of the general formula:

and mixtures thereof, under an inert atmosphere at a temperature of from about —50 to 100° C. and (2) subsequently contacting the product with at least an equimolar proportion of a base in a substantially anhydrous polar solvent under an inert atmosphere at a temperature of from about 50 to 120° C.; wherein, in each of the above formulae, each X is a halogen radical, $n$ is an integer of from 1 to 3, R is a radical selected from the group consisting of hydrogen and methyl, Ar is a polyvalent aromatic residue containing from 6 to 14 carbon atoms and having a valency numerically equal to $n+1$, $R_1$ and $R_2$ are independently selected hydrocarbon radicals containing from 1 to 20 carbon atoms, and M is an alkali metal.

References Cited in the file of this patent

Kosolapoff: "Organo Phosphorus Compounds," page 98, John Wiley & Sons, Inc., New York (1950).

UNITED STATES PATENT OFFICE
CERTIFICATE OF CORRECTION

Patent No. 3,065,210 November 20, 1962

John G. Abramo et al.

It is hereby certified that error appears in the above numbered patent requiring correction and that the said Letters Patent should read as corrected below.

Column 5, line 58, for "para-" read -- meta- --; column 6, line 29, for "perparing" read -- preparing --; line 42, for "a", first occurrence, read -- at --.

Signed and sealed this 14th day of May 1963.

(SEAL)
Attest:

ERNEST W. SWIDER
Attesting Officer

DAVID L. LADD
Commissioner of Patents